United States Patent Office 3,242,644
Patented Mar. 29, 1966

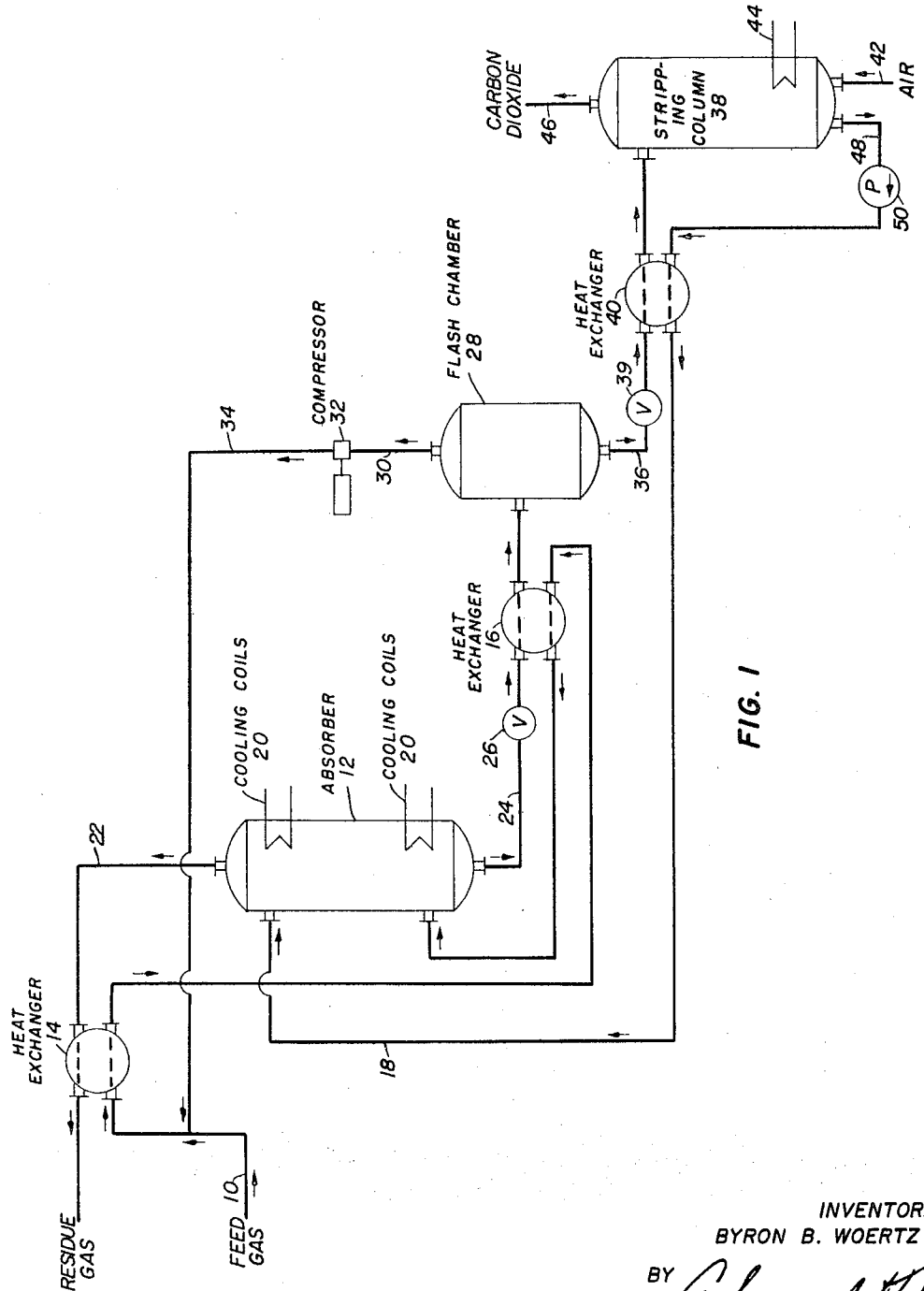
FIG. I
INVENTOR.
BYRON B. WOERTZ

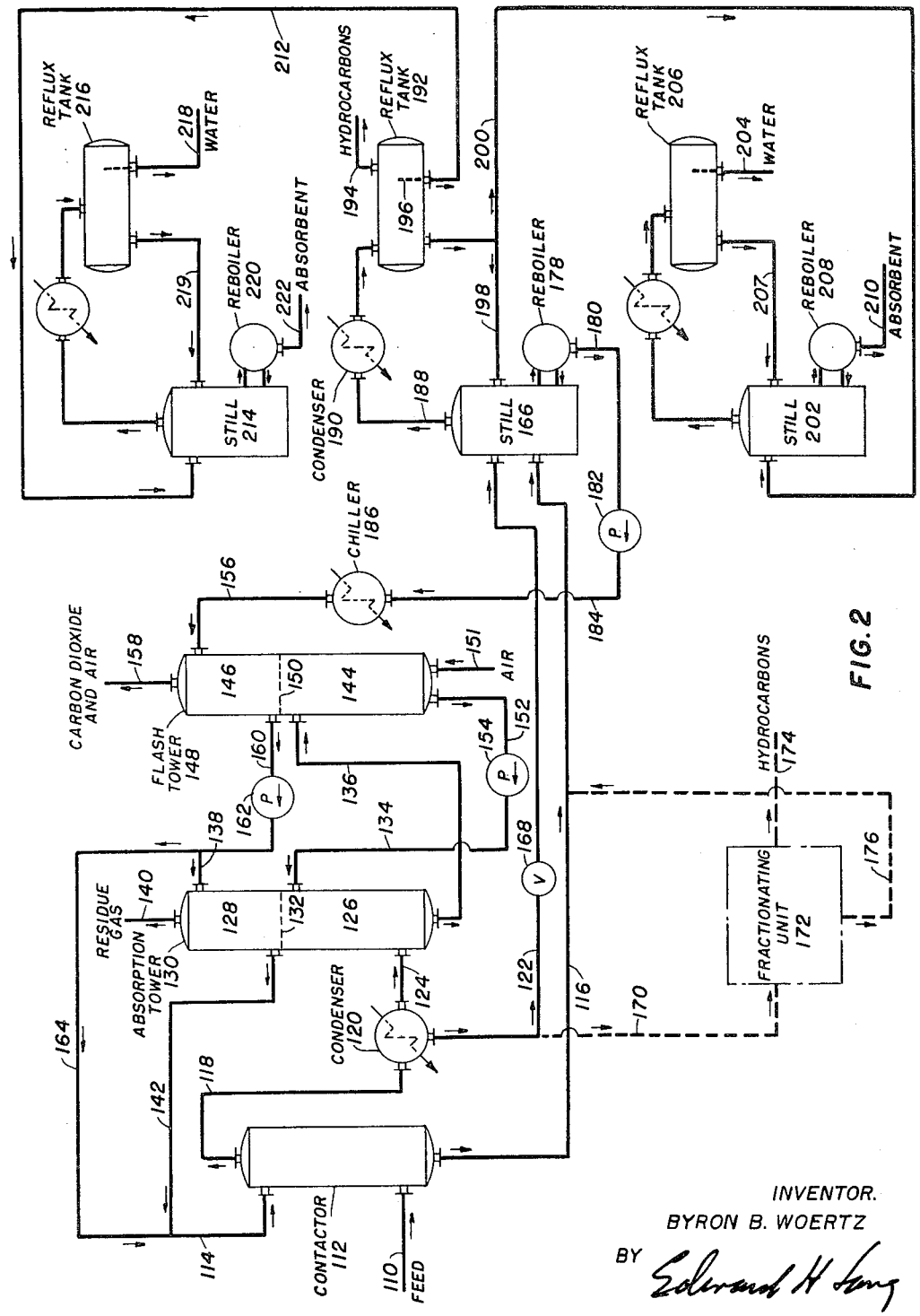

3,242,644
PROCESS FOR REMOVING ACID CONSTITUENTS FROM GASEOUS MIXTURES
Byron B. Woertz, Crystal Lake, Ill., assignor, by mesne assignments, to Union Oil Company of California, Los Angeles, Calif., a corporation of California
Filed Dec. 27, 1962, Ser. No. 247,701
14 Claims. (Cl. 55—48)

This invention relates to a selective solvent for removing acid gases from admixtures with non-acidic constituents, and more particularly, to an improved process for the removal of carbon dioxide from a gaseous mixture of hydrocarbons and/or other non-acidic constituents containing carbon dioxide by the use of a selective solvent consisting essentially of at least one alkyl or alkenyl ester of a keto acid.

The acid gas content of natural gases varies between broad limits, depending on the field from which it was produced. Natural gases produced from some subterranean reservoirs contain undesirably high concentrations of acid gases, such as carbon dioxide and hydrogen sulfide. Before these gases can be sold, it is necessary that the high concentration of acid gases be removed or at least reduced to an acceptable concentration. Various methods of removing acid gases from natural gas have been proposed. The removal of hydrogen sulfide has been accomplished by several acceptable commercial methods, but the removal of carbon dioxide remains a problem in the art.

Since carbon dioxide is chemically reactive while the hydrocarbon gases are relatively inert, one approach taken in attempting to solve the problem of removing carbon dioxide from mixtures containing the same is the use of solvents which react with carbon dioxide to remove it in chemically combined form. For example, (1) hot potassium carbonate and (2) mono- or diethanolamine have been proposed for removing carbon dioxide from natural gas. However, in order for any separation process to be practical, it must be possible to regenerate and recycle the solvent. It is apparent that regeneration of the chemically reactive solvents is expensive, and processes based on them are especially expensive when high concentrations of $CO_2$ are involved.

It has also been proposed to remove carbon dioxide from gaseous mixtures by the utilization of solvents which have a selective solubility for carbon dioxide. Selective solvents currently used commercially in carbon dioxide removal processes are water, methyl alcohol, acetone and propylene carbonate. The selectivity of water for carbon dioxide is excellent, but its capacity is very low, thereby requiring high circulation rates and large tower sizes in the water-wash process. At ambient temperature, the capacities of methyl alcohol and acetone are high but their selectivities are very poor. Propylene carbonate extraction is the most economical method of removing large concentrations of carbon dioxide from high pressure methane since its capacity for carbon dioxide is high and its selectivity for extracting carbon dioxide from methane is excellent.

It is, therefore, a primary object of this invention to provide a process for removing acid gases from gaseous mixtures containing same. Another object of this invention is to provide a process for removing carbon dioxide from a hydrocarbon gas mixture containing same. Still another object of this invention is to provide a process for removing carbon dioxide from gaseous mixtures utilizing a superior selective solvent consisting essentially of at least one alkyl or alkenyl ester of a keto acid. A still further object of this invention is to provide a process for removing carbon dioxide and moisture from gaseous mixtures containing the same utilizing a solvent consisting essentially of at least one alkyl or alkenyl ester of a keto acid in combination with a second, higher boiling, hygroscopic solvent. These and further objects of this invention will become apparent and be described as the description herein proceeds and reference is made to the accompanying drawings in which:

FIGURE 1 is a diagrammatic illustration of an absorption-desorption system for carrying out the process of this invention; and FIGURE 2 is a diagrammatic illustration of an alternative embodiment of an absorption-desorption system for carrying out this process of this invention utilizing a combination of solvents, namely, a solvent consisting essentially of at least one alkyl or alkenyl ester of a keto acid and a higher boiling hygroscopic solvent.

This invention is based on the discovery that a solvent consisting essentially of at least one alkyl or alkenyl ester of a keto acid is an effective solvent for removing carbon dioxide from and gaseous mixtures containing hydrocarbons and/or other non-acidic constituents. The keto-acid esters which are effective carbon dioxide solvents in accordance with this invention are of the formula:

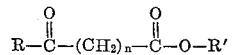

wherein R and R' are the same or different alkyl or alkenyl groups of 1–3 carbon atoms and $n$ is an integer of 0–2. Preferred keto-acid esters are those having a maximum molecular weight of about 130. Non-limiting examples of compounds coming within the scope of the foregoing formula and definition are:

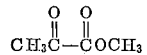

Methyl pyruvate

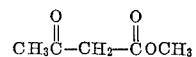

Methyl acetoacetate

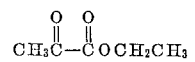

Ethyl pyruvate

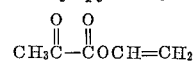

Ethenyl pyruvate

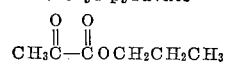

n-Propyl pyruvate

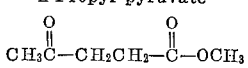

Methyl levulinate

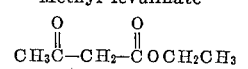

Ethyl acetoacetate

In general, this invention contemplates the removal of carbon dioxide from gaseous mixtures containing same by treatment with a selective solvent consisting essentially of at least one alkyl or alkenyl ester of a keto-acid. While the process of this invention is especially useful for removing carbon dioxide from natural gas, it is also applicable to the treatment of any carbon dioxide-containing gaseous mixture as long as the solvent has a selectivity for extracting carbon dioxide therefrom. For example, the solvent of this invention can be used for removing carbon dioxide from flue gas, hydrogen, or reformed gas for ammonia synthesis. The selective solvents of this invention are also generally effective for removing hydrogen sufide from gaseous mixtures.

The keto-acid ester solvents of this invention may be used in the pure form and in admixture with inert solvents to modify one of the properties of the keto-acid ester solvent, such as to modify its capacity and/or selectivity for absorbing carbon dioxide. The inert solvent is defined as one which is unreactive toward the keto-acid ester (and other solvent constituents) and the constituents of the gas being treated. In general, the solvent mixture may contain at least about 50% by volume of at least one alkyl or alkenyl keto-acid ester and up to about 50% by volume of at least one inert solvent. Preferred inert solvents are liquids which are also selective absorbents for carbon dioxide. Examples of suitable solvents with which the solvent of this invention may be used in admixture include propylene carbonate, ethylene carbonate, N,N'-dimethylformamide, nitromethane, and hydracrylonitrile. Ethylene carbonate, having a melting point of about 95° F., is considered a liquid in the specification since mixtures of it with other solvents are usually liquid at ambient temperatures, e.g. 70°–80° F. I have found that an especially effective solvent mixture is one consisting of 50–75% by volume of an alkyl or alkenyl ester of a keto-acid of the foregoing formula and definition in admixture with 25–50% by volume of hydracrylonitrile. The keto-acid esters of this invention are preferably used under anhydrous conditions because, in some cases, water will introduce corrosion problems.

The process of this invention is carried out using conventional absorption procedures, wherein the gaseous mixture is contacted with the selective solvent of this invention in either batchwise or counter-current treatment. Successive batchwise extractions can also be used. In the preferred method of practicing the invention, the gaseous mixture to be treated is contacted in a counter-current absorption tower with the absorbent in a continuous flow method. The spent solvent is continuously withdrawn from the absorption tower and is introduced into a flash chamber and/or air-stripping column to remove the absorbed gases. Vacuum flash can be substituted for air stripping, if desired. The regenerated solvent is then recycled through the absorption tower where it is used again.

The extraction process is preferably carried out at temperatures within the range of about $-50°$ to $100°$ F., although higher and lower temperatures may be utilized. It will be evident that the minimum temperature at which any specific solvent can be used is the minimum temperature at which the composition is a liquid. Pressures from about 100 to 1500 p.s.i.g. (pounds per square inch gauge) may be used. The vaporization loss of the solvent is a factor to be considered in determining the contacting conditions. The maximum contact temperature should be limited to prevent an excessive loss of the solvent. In general, the feed gas and solvent are contacted at a rate of 5 to 150 gallons of solvent per MCF of gas measured under standard conditions, i.e., 14.7 p.s.i.a. and 60° F.

This invention is best understood by reference to FIGURE 1, wherein a feed gaseous mixture such as natural gas, containing carbon dioxide which is to be removed therefrom, is feed through line 10 into the bottom of absorber 12 after it passes in indirect heat exchange with the residue gas from absorber 12 in heat exchanger 14 and rich absorbent in heat exchanger 16. The absorbent consisting essentially of methyl acetoacetate, which is hereinafter referred to merely as the absorbent, is introduced into the top of absorber 12 through line 18. Absorber 12 can be any suitable absorption column, such as a vertically extended column, containing appropriate packing or trays to assure intimate countercurrent contact of the rising feed mixture with the downflowing absorbent, and cooling coils 20 to provide the desired degree of cooling, as illustrated in the drawing. Absorber 12 is maintained under such conditions of pressure, usually superatmospheric, and temperature that carbon dioxide is absorbed from the feed mixture. As previously indicated, the absorption process is preferably carried out at a temperature within the range of about $-50°$ to $100°$ F. and a pressure between about 100 and 1500 p.s.i.g. The amount and rate of carbon dioxide absorption increase directly with an increase in the pressure maintained in the absorption zone, in the lower pressure ranges. The feed mixture, from which at least part of the carbon dioxide content has been absorbed, is then removed from absorber 12 through line 22, passed in indirect heat exchange with the feed gas in exchanger 14, and fed to a suitable receiver or otherwise disposed.

The rich absorbent, containing absorbed carbon dioxide, is withdrawn from absorber 12 through line 24. Then, the rich absorbent undergoes a controlled pressure reduction, such as by being passed successively through expansion valve 26 and heat exchanger 16 into flash chamber 28. Flash chamber 28 is maintained at a pressure below the pressure of absorption column 12, but above atmospheric pressure, e.g., about 25 to 400 p.s.i.g. so that the flash gas is about 5 to 10% of the inlet gas in line 10 at standard temperature and pressure. As the absorbent undergoes pressure reduction, it becomes cooled due to the loss of heat of absorption acquired in absorber 12 and expansion of absorbed carbon dioxide to a lower partial pressure. Part of the absorbed carbon dioxide and non-acidic constituents of the feed gas are withdrawn from flash chamber 28 through line 30. The gases in line 30 are compressed in compressor 32 and passed through line 34 to be mixed with the feed gas before it passes through exchanger 14. The partially desorbed absorbent is withdrawn from flash chamber 28 through line 36 and fed into stripping column 38 after it has passed successively through expansion valve 39 and exchanger 40, in indirect heat exchange with the lean absorbent withdrawn from column 38.

Air or other inert stripping gas is introduced into stripping column 38 through line 42. Stripping column 38 is provided with heating coil 44 to apply heat if necessary. In stripping column 38, substantially all of the remaining absorbed carbon dioxide is removed from the absorbent and withdrawn through line 46 to be disposed of as desired. Line 46 may be provided with a vacuum pump, if desired. The resulting lean absorbent is then withdrawn from stripping column 38 through line 48, where it is forced by pump 50 through heat exchanger 40 and then returned to absorber 12 through line 18. It will be evident that line 18 may include a second heat exchanger, not shown, to further cool the lean absorbent after it has passed through heat exchanger 40.

Other alternative absorption-desorption processes will be apparent to those skilled in the art. For example if it is not desired to limit the loss of the non-acidic constituents of the feed gas, the rich absorbent may be desorbed in a flash or stripping step and the off-gases disposed of as desired. The partially desorbed absorbent may then be recycled to the absorber or introduced into a stripping column to remove the last vestiges of absorbed carbon dioxide before it is recycled to the absorption column. The residue gas from the absorber and/or the flash gas may be passed through a solid bed of an adsorbent, such as silica gel, activated alumina, activated carbon or a synthetic zeolite, to separate vaporized absorbent therefrom.

In an alternative embodiment of this invention, the absorbent of this invention may be used in combination with a second higher boiling hygroscopic solvent which is absorptive of it, to avoid the uneconomically high solvent losses which are common in conventional processes. The hygroscopic solvent serves to remove moisture from the feed gaseous mixture, as well as to recover the absorbent which would otherwise be lost in the product gas stream. The hygroscopic solvent is any of the polyhydric alcohols or glycols which have been proposed or used for moisture extraction, such as ethylene glycol, propylene glycol, diethylene glycol, triethylene glycol and aqueous solutions thereof.

This alternative embodiment is best understood by reference to FIGURE 2, wherein the numeral 110 represents the line through which the gas is to be treated. For example, a natural gas consisting of hydrocarbons, carbon dioxide, and moisture, is fed into the bottom of contactor 112, in which it is countercurrently contacted with a mixture of a keto-acid ester solvent of this invention, such as methyl acetoacetate, and a hygroscopic solvent entering through line 114. Contactor 112, which may contain any suitable type and arrangement of trays or baffles as required for intimacy of contact between the absorbent mixture and feed gas, is preferably maintained at a temperature within the range of about 0° to 100° F. and pressure within the range of about 100 to 1500 p.s.i.g., although higher and lower temperatures and pressures may be used. A suitable example of the absorbent mixture entering contactor 112 through line 114 is 75–100% by weight of a glycol, such as diethylene glycol, 0–25% by weight of the keto-acid ester, such as methyl acetoacetate and 0–5% by weight of water. In contactor 112, a small part of the methyl acetoacetate content of solvent mixture may vaporize, and much of the water content of the feed gas stream is taken up by the diethylene glycol solvent. The diethylene glycol absorbent, containing water and some methyl acetoacetate absorbent, is withdrawn from contactor 112 through line 116. The resulting natural gas containing some methyl acetoacetate leaves contactor 112 through line 118, and flows to chiller-condenser 120, in which its temperature is reduced to absorption temperature, for example, −50° to 80° F. Condensed hydrocarbons, methyl acetoacetate and/or water are withdrawn from chiller-condenser 120 through line 122.

The chilled, uncondensed components of the natural gas-methyl acetoacetate absorbent mixture pass from chiller-condenser 120 through line 124 to the absorbing zone which, as illustrated, may be contained within the lower and upper sections 126 and 128 of a single vertically extended absorption tower 130, the two sections being separated by liquid trap-out tray 132. Absorber 130 can have any suitable arrangement of packing or trays to assure intimate countercurrent contact of the rising feed mixture with the down-flowing absorbent. In section 126, the gas is countercurrently contacted with methyl acetoacetate absorbent entering through line 134, which removes at least part of the acid gas constituents. Rich methyl acetoacetate containing absorbed carbon dioxide is withdrawn from absorption tower 130 through line 136. The scrubbed natural gas passes on upward in tower 130 past trap-out tray 132 into upper section 128, where it is countercurrently contacted with the glycol absorbent entering through line 138. The diethylene glycol absorbent scrubs any vaporized methyl acetoacetate absorbent from the natural gas and the scrubbed natural gas product of reduced carbon dioxide content is withdrawn through line 140 to a suitable receiver or other disposition. The mixture of glycol and methyl acetoacetate absorbents from upper section 128 is trapped on tray 132, and is withdrawn through line 142 and introduced into contactor 112 through line 114.

The methyl acetoacetate absorbent in line 136 enters a combined flashing and contacting zone which, as illustrated, may be lower flashing zone 144 and upper contacting zone 146 in a single vertically extended flash tower 148, with the upper and lower sections being separated by liquid trap-out tray 150. The rich methyl acetoacetate absorbent enters flash zone 144, which is maintained at a pressure below the absorption column pressure and usually at about atmospheric pressure, where it undergoes pressure reduction to flash-off absorbed carbon dioxide. If desired, air or other inert stripping gas is introduced into zone 144 through line 151. The lean methyl acetoacetate absorbent is withdrawn from flash zone 144 through line 152 and is introduced back to absorption tower 130 by pump 154 through line 134. Carbon dioxide and stripping gas containing entrained and vaporized methyl acetoacetate absorbent leaves flash zone 144, and it passes through trap-out tray 150 into contacting zone 146 where it is counter-currently contacted with diethylene glycol solvent entering through line 156. The diethylene glycol scrubs any vaporized methyl acetoacetate absorbent from the carbon dioxide, and the carbon dioxide and stripping gas are withdrawn through line 158 to be disposed of as desired. This carbon dioxide is suitable for use in miscibly flooding oil reservoirs, if stripping gas contamination is low.

The resulting mixture of the diethylene glycol and methyl acetoacetate absorbents from contacting zone 146 of vessel 148 is trapped on tray 150 and withdrawn through line 160. Part of the solvent mixture in line 160 is passed by pump 162 to branch line 138 from where it is introduced into upper section 128 of contactor 130. The remainder of the solvent in line 160 is passed through line 164 and combined with the solvent mixture in line 142 to form the mixture entering contactor 112 through line 114.

The glycol absorbent, containing water and methyl acetoacetate in line 116 and the condensate in line 122 are introduced into glycol still 166, with the condensate in line 122 being introduced into still 166 at a point higher than that where the liquid in line 116 is introduced. Alternatively, with valve 168 closed, condensate in line 122 is passed through line 170 into fractionating unit 172 where hydrocarbons are recovered from the condensate. The hydrocarbons are removed through line 174 and the remaining glycol and methyl acetoacetate are withdrawn through line 176 and mixed with the liquid in line 116.

Glycol still 166 is equipped with reboiler 178 from which regenerated diethylene glycol is withdrawn through line 180 and forced by pump 182 successively through line 184, chiller 186, and line 156 to contacting zone 146 of vessel 148. Overhead from still 166, comprising the methyl acetoacetate absorbent, water, and hydrocarbons, is passed through line 188 and condenser 190 into reflux tank 192. Non-condensable hydrocarbon gases are vented from reflux tank 192 by line 194. Since the methyl acetoacetate absorbent is heavier than water and not completely water miscible, it is separated from the water in reflux tank 192 by providing reflux tank with short standpipe 196 through which the lighter water layer is withdrawn. The heavier methyl acetoacetate absorbent layer is withdrawn from reflux tank 192 and part of it is returned to still 166, as reflux, through 198 and the remaining portion is passed through line 200 into methyl acetoacetate still 202. Water, which is carried overhead from still 202 with some methyl acetoacetate, is removed from reflux tank 206 through line 204 and either discarded or combined with the water withdrawn through standpipe 196. Methyl acetoacetate carried overhead from still 202 with the water, and separated therefrom in reflux tank 206, is returned to still 202 through line 207. Substantially dry methyl acetoacetate absorbent is removed from reboiler 208 through line 210 and returned to the system.

The water separated from the methyl acetoacetate in reflux tank 192 by standpipe 196 is passed through line 212 into water still 214. Water, which is carried overhead from still 214 with some methyl acetoacetate, is removed from reflux tank 216 through line 218 and discarded, while the methyl acetoacetate is returned to still 214 from reflux tank 216 through line 219. Dry methyl acetoacetate or a methyl acetoacetate-water mixture is withdrawn from reboiler 220 of still 214 through line 222 and returned to the system. As hereinbefore pointed out, the water removed from reflux tank 206 may be combined with the water in line 212 before it is introduced into still 214.

Since a small amount of water in the methyl acetoacetate absorbent is not especially detrimental to its effectiveness in absorbing carbon dioxide, methyl acetoacetate still 202 may not be required in many instances. In any case, glycol still 166, methyl acetoacetate still 202, and water still 214 need be only relatively small units.

The following specific examples will serve more particularly to point out the instant invention.

theoretical trays and maintained at 600 p.s.i.a. and 0° F., with the lean absorbent. One hundred mols of the natural gas per unit time are contacted in different runs with methyl acetoacetate and propylene carbonate in such amounts that the residue gas contains about 2 volume percent of carbon dioxide. The rich absorbent withdrawn from absorber 12 is flashed at 150–200 p.s.i.a. and 0° F. in flash chamber 28 and the pressure of the partially desorbed absorbent withdrawn from flash chamber 28 is reduced to atmospheric pressure in stripping column 38. Table I gives the compositions of the process streams where the gas is contacted with methyl acetoacetate and, for the purpose of comparison, Table II gives the composition of the process streams wherein the gas is contacted with the propylene carbonate. From an inspection of Tables I and II it can be seen that while the selectivity of methyl acetoacetate is somewhat lower than that of propylene carbonate (note the hydrocarbon content of the residue gas), it has a higher capacity for carbon dioxide than propylene carbonate possesses, since the required solvent circulation is only 19.9 gallons of methyl acetoacetate per MCF of inlet gas as compared to 26.2 gal./MCF when using propylene carbonate (gas and solvent volumes measured at 14.7 p.s.i.a. and 60° F.).

TABLE I

Carbon Dioxide Absorption Process Using Methyl Acetoacetate

| Components | Mols of Inlet Gas (Line 10) | Mols of Solvent (Line 18) | Residue Gas (Line 22) | | Mols of Rich Solvent (Line 24) | 200 p.s.i.a. Flash Gas (Line 30) | | Atmos. Strip Gas (Line 46) | | Percent Loss |
|---|---|---|---|---|---|---|---|---|---|---|
| | | | Mols | Mol percent | | Mols | Mol percent | Mols | Mol percent | |
| Methane | 72.00 | | 71.45 | 90.99 | 4.62 | 4.07 | 43.2 | 0.55 | 2.6 | 0.76 |
| Ethane | 6.00 | | 5.03 | 6.41 | 2.08 | 1.11 | 11.8 | 0.96 | 4.5 | 16.0 |
| Propane | 2.00 | | 0.48 | 0.61 | 2.05 | 0.53 | 5.6 | 1.52 | 7.1 | 76.0 |
| $CO_2$ | 19.00 | | 1.56 | 1.99 | 21.03 | 3.59 | 38.1 | 17.44 | 81.2 | 91.8 |
| n-Butane | 1.00 | | 0 | 0 | 1.12 | 0.12 | 1.3 | 1.00 | 4.6 | 100.0 |
| Methyl Acetoacetate | | 58.55 | 0 | 0 | 58.55 | 0 | 0 | 0 | 0 | 0 |
| Total | 100.00 | 58.55 | 78.52 | 100.00 | 89.45 | 9.42 | 100.0 | 21.47 | 100.0 | |

Circulation rate: 19.9 gals. of solvent/MCF of feed gas.

TABLE II

Carbon Dioxide Absorption Process Using Propylene Carbonate

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | | Percent Loss |
|---|---|---|---|---|---|---|---|---|---|---|
| | | | Mols | Mol percent | | Mols | Mol percent | Mols | Mol percent | |
| Methane | 72.00 | | 71.56 | 89.34 | 2.53 | 2.09 | 41.8 | 0.44 | 2.2 | 0.61 |
| Ethane | 6.00 | | 5.46 | 6.81 | 0.99 | 0.45 | 9.0 | 0.54 | 2.7 | 9.0 |
| Propane | 2.00 | | 1.33 | 1.66 | 0.87 | 0.20 | 4.0 | 0.67 | 3.4 | 33.5 |
| $CO_2$ | 19.00 | | 1.60 | 2.00 | 19.56 | 2.16 | 43.2 | 17.40 | 87.4 | 91.6 |
| n-Butane | 1.00 | | 0.15 | 0.19 | 0.95 | 0.10 | 2.0 | 0.85 | 4.3 | 85.0 |
| Propylene Carbonate | 0 | 98.43 | 0 | 0 | 98.43 | 0 | 0 | 0 | 0 | |
| Total | 100.00 | 98.43 | 80.10 | 100.00 | 123.33 | 5.00 | 100.0 | 19.90 | 100.0 | |

Circulation rate: 26.2 gals. of solvent/MCF of feed gas.

EXAMPLE I

A gaseous mixture containing 13.5% of carbon dioxide and 86.5% of methane is brought into equilibrium with methyl acetoacetate at 0° F. and 900 p.s.i.g. When analyzed, the resulting liquid phase is found to contain 26.9 mol percent of carbon dioxide, 9.7 mol percent of methane, and 63.4 mol percent of methyl acetoacetate. This indicates a solubility under these conditions of 12.5 s.c.f./gal. of carbon dioxide and 4.5 s.c.f./gal. of methane.

EXAMPLE II

Tables I and II are illustrative of the process streams of the process depicted in FIGURE 1 wherein a natural gas mixture is treated in absorber 12, containing ten

EXAMPLE III

Tables III, IV, and V are also illustrative of the process streams of the process depicted in FIGURE 1 wherein the natural gas mixture of Example II is contacted with an absorbent and flashed under the conditions described in Example II. This example demonstrates the effectiveness of the solvents consisting of a blend of methyl acetoacetate and hydracrylonitrile. Table III shows the solvent consisting of 50 vol. percent of both methyl acetoacetate and hydracrylonitrile exhibits improved selectivity with reduced capacity when compared with propylene carbonate, while the 75/25 blend of methyl acetoacetate and hydracrylonitrile of Table IV shows improved capacity with reduced selectivity. The intermediate blend of 62.5 vol. percent of methyl acetoacetate and 37.5 vol. percent of hydracrylonitrile of Table V achieves a very satisfactory balance between capacity and selectivity, showing both improved capacity and improved selectivity, when compared to propylene carbonate. Selectivity improvement is largely concerned with methane and ethane. This 62.5-37.5 vol. percent blend is approximately an equimolar blend.

TABLE III

Carbon Dioxide Absorption Process Using 50 Vol. Percent of Hydracrylonitrile and 50 Vol. Percent of Methyl Acetoacetate

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | | Percent Loss |
|---|---|---|---|---|---|---|---|---|---|---|
| | | | Mols | Mol percent | | Mols | Mol percent | Mols | Mol percent | |
| Methane | 72.00 | | 71.67 | 88.97 | 2.69 | 2.36 | 36.0 | 0.33 | 1.7 | 0.46 |
| Ethane | 6.00 | | 5.58 | 6.93 | 0.97 | 0.56 | 8.5 | 0.42 | 2.2 | 7.0 |
| Propane | 2.00 | | 1.45 | 1.80 | 0.81 | 0.26 | 4.0 | 0.55 | 2.8 | 27.5 |
| CO$_2$ | 19.00 | | 1.61 | 2.00 | 20.63 | 3.25 | 49.5 | 17.38 | 89.4 | 91.5 |
| n-Butane | 1.00 | 139.22 | 0.24 | 0.30 | 0.80 | 0.13 | 2.0 | 0.76 | 3.9 | 76.0 |
| Solvent | 0 | | 0 | 0 | 139.22 | 0 | 0 | 0 | 0 | |
| Total | 100.00 | 139.22 | 80.55 | 100.00 | 165.21 | 6.56 | 100.00 | 19.44 | 100.0 | |

Circulation rate: 36.4 gals. of solvent/MCF of feed gas.

TABLE IV

Carbon Dioxide Absorption Process Using 25 Vol. Percent of Hydracrylonitrile and 75 Vol. Percent of Methyl Acetoacetate

| Components | Mols of Inlet Gas (Line 10) | Mols of Solvent (Line 18) | Residue Gas (Line 22) | | Mols of Rich Solvent (Line 24) | 200 p.s.i.a. Flash Gas (Line 30) | | Atmos. Strip Gas (Line 46) | | Percent Loss |
|---|---|---|---|---|---|---|---|---|---|---|
| | | | Mols | Mol percent | | Mols | Mol percent | Mols | Mol percent | |
| Methane | 72.00 | | 71.60 | 89.64 | 2.99 | 2.59 | 38.9 | 0.40 | 2.0 | 0.56 |
| Ethane | 6.00 | | 5.43 | 6.80 | 1.21 | 0.64 | 9.6 | 0.57 | 2.8 | 9.5 |
| Propane | 2.00 | | 1.20 | 1.50 | 1.09 | 0.29 | 4.4 | 0.80 | 4.0 | 40.0 |
| CO$_2$ | 19.00 | | 1.60 | 2.00 | 20.41 | 3.01 | 45.2 | 17.40 | 86.5 | 91.6 |
| n-Butane | 1.00 | | 0.05 | 0.06 | 1.08 | 0.13 | 1.9 | 0.95 | 4.7 | 95.0 |
| Solvent | 0 | 84.07 | 0 | 0 | 84.07 | 0 | 0 | 0 | 0 | |
| Total | 100.00 | 84.07 | 79.88 | 100.00 | 110.85 | 6.66 | 100.0 | 20.12 | 100.0 | |

Circulation rate: 24.8 gals. of solvent/MCF of feed gas.

TABLE V

Carbon Dioxide Absorption Process Using 37.5 Vol. Percent Hydracrylonitrile and 62.5 Vol. Percent Methyl Acetoacetate

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | | Percent Loss |
|---|---|---|---|---|---|---|---|---|---|---|
| | | | Mols | Mol percent | | Mols | Mol percent | Mols | Mol percent | |
| Methane | 72.00 | | 71.79 | 89.29 | 1.72 | 1.51 | 36.6 | 0.21 | 1.1 | 0.29 |
| Ethane | 6.00 | | 5.57 | 6.94 | 0.84 | 0.41 | 9.9 | 0.43 | 2.2 | 7.2 |
| Propane | 2.00 | | 1.34 | 1.66 | 0.84 | 0.18 | 4.4 | 0.66 | 3.4 | 33.0 |
| CO$_2$ | 19.00 | | 1.61 | 2.00 | 19.34 | 1.95 | 47.2 | 17.39 | 88.7 | 91.5 |
| n-Butane | 1.00 | | 0.09 | 0.11 | 0.99 | 0.08 | 1.9 | 0.91 | 4.6 | 91.0 |
| Solvent | 0 | 71.87 | 0 | 0 | 71.87 | 0 | 0 | 0 | 0 | |
| Total | 100.00 | 71.87 | 80.40 | 100.00 | 95.60 | 4.13 | 100.0 | 19.60 | 100.0 | |

Circulation rate: 19.9 gals. of solvent/MCF of feed gas.

The embodiments of the invention in which an exclusive property or privilege is claimed are defined as follows:

1. The process of removing gaseous acid gas selected from the group consisting of carbon dioxide and hydrogen sulfide from admixture with gaseous $C_1$-$C_3$ alkane hydrocarbons which comprises contacting said gaseous admixture with a liquid solvent consisting essentially of at least one keto-acid ester of the formula,

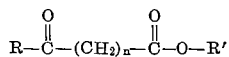

wherein R and R' are the same or different radicals of the group consisting of alkyl and alkenyl radicals containing 1 to 3 carbon atoms and $n$ is an integer of 0 to 2, under conditions resulting in selective absorption of said acid gas, and separating the unabsorbed components of said gaseous admixture from said solvent.

2. The process according to claim 1 in which said acid gas is carbon dioxide and said keto-acid ester has a maximum molecular weight of about 130.

3. The process according to claim 2 in which said solvent additionally contains an inert liquid selected from the group consisting of propylene carbonate, ethylene carbonate, nitromethane and N,N-dimethylformamide.

4. The process according to claim 3 in which said solvent consists of at least 50–75% vol. of said keto-acid ester and said keto-acid ester is methyl acetoacetate.

5. The process according to claim 2 in which said gaseous admixture is passed through an absorption zone at superatmospheric pressure in countercurrent contact with said solvent and a stream of rich solvent is removed from said absorption zone and the pressure thereof is reduced to flash off carbon dioxide and at least part of the residual carbon dioxide from said solvent stream following said pressure reduction is removed.

6. The process according to claim 5 in which said contacting is carried out at a temperature from about —50° F. to 100° F. and a pressure from 100 to 1500 p.s.i.g.

7. The process of removing gaseous acid gas selected from the group consisting of carbon dioxide and hydrogen sulfide from admixture with gaseous $C_1$-$C_3$ alkane hydrocarbons which comprises contacting said gaseous admixture in a first contacting zone with a mixture of a first solvent consisting essentially of at least one keto-acid ester of the formula,

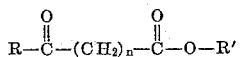

wherein R and R' are the same or different radicals of the group consisting of alkyl and alkenyl radicals containing 1 to 3 carbon atoms and $n$ is an integer of 0 to 2, and a second, higher boiling solvent adapted to absorb said first solvent; separately withdrawing a liquid stream consisting essentially of said second solvent and a gaseous stream from said first contacting zone; passing said gaseous stream comprising vaporized first solvent and unabsorbed components of said gaseous admixture fed to said first contacting zone through a cooling zone whereby part of said gaseous stream is condensed; separately withdrawing condensate and uncondensed components of said gaseous stream from said first cooling zone; combining said condensate with said liquid stream from said first contacting zone and separating absorbed second solvent from said combined solution; contacting the uncondensed components of said gaseous stream in a second contacting zone with said first solvent, under conditions resulting in partial vaporization of said first solvent and absorption of said acid gas in the unvaporized first solvent; separately withdrawing a liquid stream of spent first solvent and a gaseous stream from second contacting zone; contacting the gaseous stream from said second contacting zone in a third contacting zone with said second solvent, under conditions resulting in absorption of vaporized first solvent; separately withdrawing from said third contacting zone the unabsorbed components of the gaseous stream from said second contacting zone and said second solvent containing absorbed first solvent; recycling said second solvent from said third contacting zone to said first contacting zone; and separating the absorbed acid gas from said spent first solvent.

8. The process according to claim 7 in which said keto-acid ester has a maximum molecular weight of about 130 and the uncondensed components of said gaseous stream are passed through said second contacting zone at superatmospheric pressure in countercurrent contact with said first solvent.

9. The process according to claim 8 in which the pressure of said spent first solvent is reduced in a desorbing zone to flash-off acid gas, and the acid gas separated from said spent first solvent in said desorbing zone is contacted with said second solvent in a fourth contacting zone whereby entrained vaporized first solvent is absorbed.

10. The process according to claim 9 in which said second solvent withdrawn from said first contacting zone is introduced into said fourth contacting zone after at least part of the first solvent is removed therefrom.

11. The process according to claim 10 in which a stream of said second solvent is removed from said fourth contacting zone and parts thereof are introduced into said first and third contacting zones.

12. The process according to claim 11 in which said first solvent additionally contains an inert liquid selected from the group consisting of propylene carbonate, ethylene carbonate, nitromethane and N,N-dimethylformamide.

13. The process according to claim 12 in which said first solvent consists of at least 50-75% vol. of said keto-acid ester.

14. The process according to claim 7 in which said keto-acid ester is methyl acetoacetate.

References Cited by the Examiner

UNITED STATES PATENTS

| | | | |
|---|---|---|---|
| 2,139,375 | 12/1938 | Millar et al. | 55—73 |
| 2,486,778 | 11/1949 | Doumani | 23—2 |
| 2,668,748 | 2/1954 | Asbury | 23—150 X |
| 2,781,863 | 2/1957 | Bloch et al. | 55—73 X |
| 2,863,527 | 12/1958 | Herbert et al. | 55—73 X |
| 2,926,751 | 3/1960 | Kohl et al. | 55—68 X |
| 3,097,917 | 7/1963 | Dotts et al. | 55—73 X |
| 3,137,654 | 6/1964 | Johnson et al. | 23—2 X |

FOREIGN PATENTS

| | | |
|---|---|---|
| 596,692 | 4/1960 | Canada. |
| 596,693 | 4/1960 | Canada. |
| 728,444 | 4/1955 | Great Britain. |
| 750,399 | 6/1956 | Great Britain. |

REUBEN FRIEDMAN, *Primary Examiner.*

D. TALBERT, *Assistant Examiner.*